(12) United States Patent
Sakakibara et al.

(10) Patent No.: US 7,900,908 B2
(45) Date of Patent: Mar. 8, 2011

(54) AUTOMATIC PAPER FEED DEVICE, IMAGE READING APPARATUS, AND IMAGE FORMING APPARATUS

(75) Inventors: Akihiro Sakakibara, Toyota (JP); Takashi Ohama, Iwakura (JP)

(73) Assignee: Brother Kogyo Kabushiki Kaisha, Aichi-Ken (JP)

( * ) Notice: Subject to any disclaimer, the term of this patent is extended or adjusted under 35 U.S.C. 154(b) by 758 days.

(21) Appl. No.: 11/523,887

(22) Filed: Sep. 20, 2006

(65) Prior Publication Data

US 2007/0063417 A1 Mar. 22, 2007

(30) Foreign Application Priority Data

Sep. 20, 2005 (JP) .................................. 2005-271925

(51) Int. Cl.
*B65H 5/00* (2006.01)
(52) U.S. Cl. ...................................... 271/10.01; 399/367
(58) Field of Classification Search .................. 271/3.01, 271/3.14, 4.01, 10.01; 399/367
See application file for complete search history.

(56) References Cited

U.S. PATENT DOCUMENTS

| | | | |
|---|---|---|---|
| 6,126,347 A | 10/2000 | Sakaino et al. | |
| 6,588,740 B2 * | 7/2003 | Brugger et al. | 271/10.03 |
| 6,830,244 B2 * | 12/2004 | Komatsu | 271/10.01 |
| 2002/0093134 A1 | 7/2002 | Minakawa | |
| 2003/0047860 A1 * | 3/2003 | Takamatsu | 271/3.14 |

FOREIGN PATENT DOCUMENTS

| | | |
|---|---|---|
| JP | 61-092642 | 6/1986 |
| JP | 8290835 | 11/1996 |
| JP | 10007292 | 1/1998 |
| JP | 11255364 | 9/1999 |
| JP | 2002274701 | 9/2002 |
| JP | 2003246467 | 9/2003 |
| WO | WO 9858863 | 12/1998 |

OTHER PUBLICATIONS

Notice of Reasons for Rejection issued in corresponding Japanese Application No. 2005-271925 on May 11, 2010.
Notice of Reasons for Rejection issued in corresponding Japanese Application No. 2005-271925 dated Aug. 24, 2010.

* cited by examiner

*Primary Examiner* — Stefanos Karmis
*Assistant Examiner* — Michael C McCullough
(74) *Attorney, Agent, or Firm* — Frommer Lawrence & Haug LLP

(57) ABSTRACT

An automatic paper feed device is provided, including a cover member that has a paper insertion opening in a nearly rectangular shape, the paper insertion opening having a longitudinal direction perpendicular to both a transport direction of the paper and a thickness direction of the paper. The paper insertion opening includes a first end opening portion, a second end opening portion, and a center opening portion arranged in the longitudinal direction of the paper insertion opening. The paper insertion opening connects a placement unit, in which paper is placed, with a separation and transport mechanism, that separates paper placed in the placement unit and transports paper placed in the placement unit in the transport direction. The first and second end opening portions are each larger in size than the central opening portion.

9 Claims, 11 Drawing Sheets

AUTOMATIC PAPER FEED DEVICE, IMAGE READING APPARATUS, AND IMAGE FORMING APPARATUS

The present invention is based on Japanese Patent Application No. 2005-271925 filed Sep. 20, 2005, the contents of which are incorporated by reference.

BACKGROUND OF THE INVENTION

1. Field of the Invention

The present invention relates to an automatic paper feed device that automatically separates and transports stacked plural sheets of paper. The present invention also relates to an image reading apparatus and an image forming apparatus, both including the automatic paper feed device.

2. Description of the Related Art

JP-A-8-290835 describes an automatic paper feed device. This device uses a separation and transport mechanism to separate and transport multiple sheets of paper that are stacked and placed in a placement unit.

Paper is thin, and easily bends downwardly due to its own weight. Generally, as shown in FIGS. 10 and 11, paper is often placed in a placement unit 19a in a condition in which the paper is bent to form an arched shape that is downwardly convex so that the bending rigidity of the paper may be increased. This makes it difficult to bend the paper in a direction perpendicular to the bend of the arched shape.

However, when the paper is bent in an arched shape and placed in the placement unit, sometimes both ends in the width direction of the paper interfere with both longitudinal ends of a paper insertion opening 25a as shown in FIG. 11. In this case, a problem arises that the paper cannot be placed precisely in a predetermined place.

Although the above problem may be solved by sufficiently increasing the size of the paper insertion opening, another problem then arises. This problem is that the cover member, which forms the paper insertion opening and covers and protects a separation and transport mechanism, may then become unable to sufficiently cover the separation and transport mechanism.

SUMMARY OF THE INVENTION

According to one embodiment of the invention, an automatic paper feed device is provided, which includes (1) a placement unit in which paper is placed, (2) a separation and transport mechanism that separates paper placed in the placement unit and transports paper placed in the placement unit in a transport direction, and (3) a cover member that has a paper insertion opening in a nearly rectangular shape, the paper insertion opening having a longitudinal direction perpendicular to both a transport direction of the paper and a thickness direction of the paper. The paper insertion opening includes a first end opening portion, a second end opening portion, and a center opening portion. The center opening portion is located in a position corresponding to the separation and transport mechanism. The first end opening portion is disposed on one side of the center opening portion in the longitudinal direction of the paper insertion opening, and the second end opening portion is disposed on the other side of the center opening portion in the longitudinal direction of the paper insertion opening. The cover member covers the separation and transport mechanism. The paper insertion opening connects the placement unit with the separation and transport mechanism. The separation and transport mechanism is provided in a position corresponding to a nearly central location of the longitudinal direction of the paper insertion opening from the perspective of a head on view of the paper insertion opening. The first and second end opening portions are each larger in size than the central opening portion.

In accordance with another embodiment of the invention, an automatic paper feed device is provided, which includes (1) a placement unit in which paper is placed, (2) a separation and transport mechanism that separates paper placed in the placement unit and transports paper placed in the placement unit in a transport direction, and (3) a cover member that has a paper insertion opening. The paper insertion opening includes a first end opening portion, a second end opening portion, and a center opening portion. The paper insertion opening has a longitudinal direction perpendicular to both a transport direction of the paper and a thickness direction of the paper. The first end opening portion is disposed on one side of the center opening portion in the longitudinal direction of the paper insertion opening, and the second end opening portion is disposed on the other side of the center opening portion in the longitudinal direction of the paper insertion opening. The cover member covers the separation and transport mechanism. The first and second end opening portions are each larger in size than the central opening portion.

In accordance with yet another embodiment of the invention, an automatic paper feed device is provided, which includes (1) a placement unit in which paper is placed, (2) a transport mechanism, and (3) a paper insertion opening having a longitudinal direction perpendicular to both a transport direction of the paper and a thickness direction of the paper. The paper insertion opening includes a first end opening portion, a second end opening portion, and a center opening portion. The first end opening portion is disposed on one side of the center opening portion in the longitudinal direction and the second end opening portion is disposed on the other side of the center opening portion in the longitudinal direction. The first end opening portion is larger in size than the central opening portion. The second end opening portion is larger in size than the central opening portion. The transport mechanism transports paper from the placement unit, through the paper insertion opening, to a predetermined place.

DETAILED DESCRIPTION OF EMBODIMENTS

Figure 1:
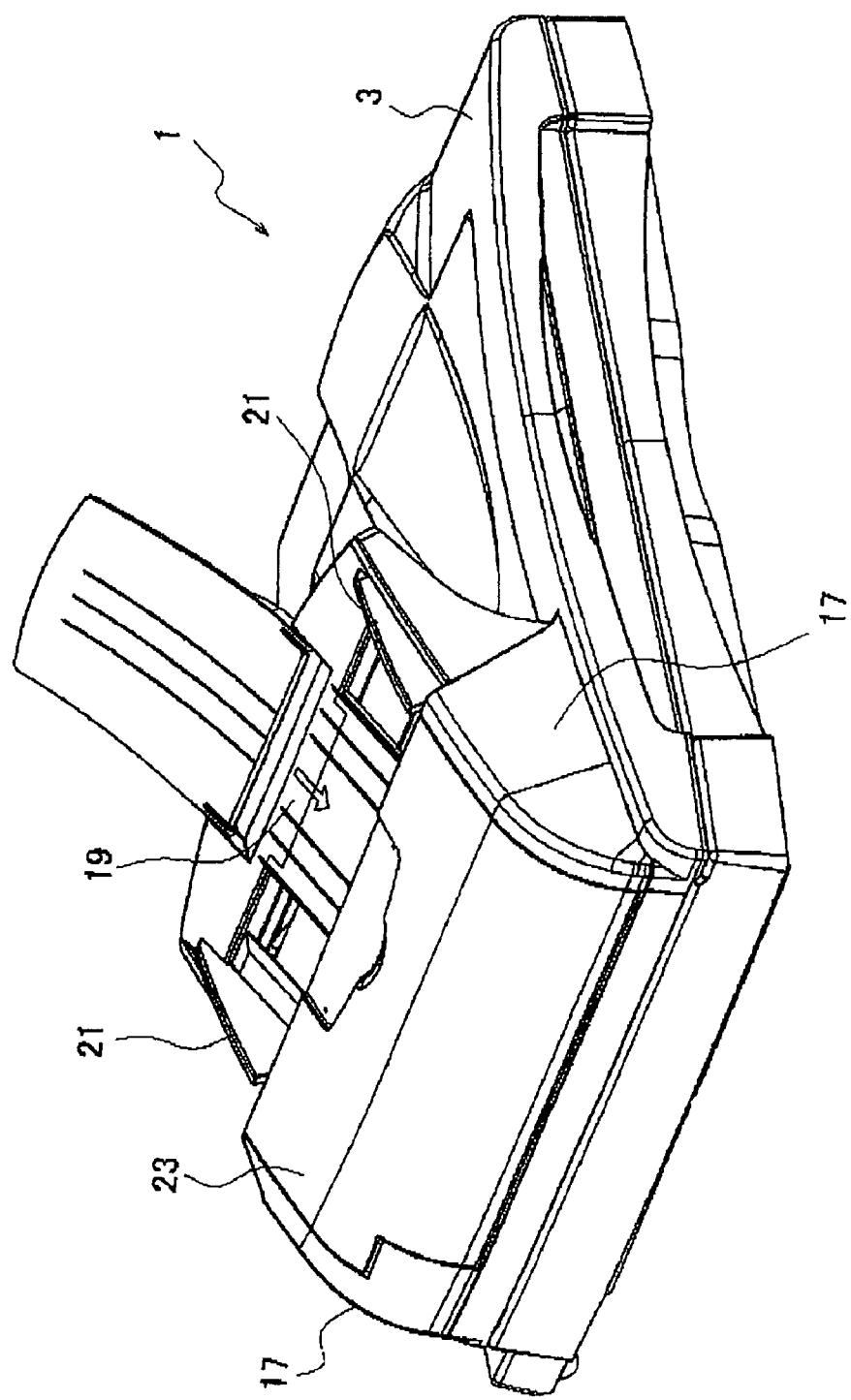
FIG. 1 is a perspective view of the appearance of an image reading apparatus 1 according to a first embodiment.

Referring now to the drawings, the present invention will be described in detail on the basis of exemplary embodiments.

Figure 2:
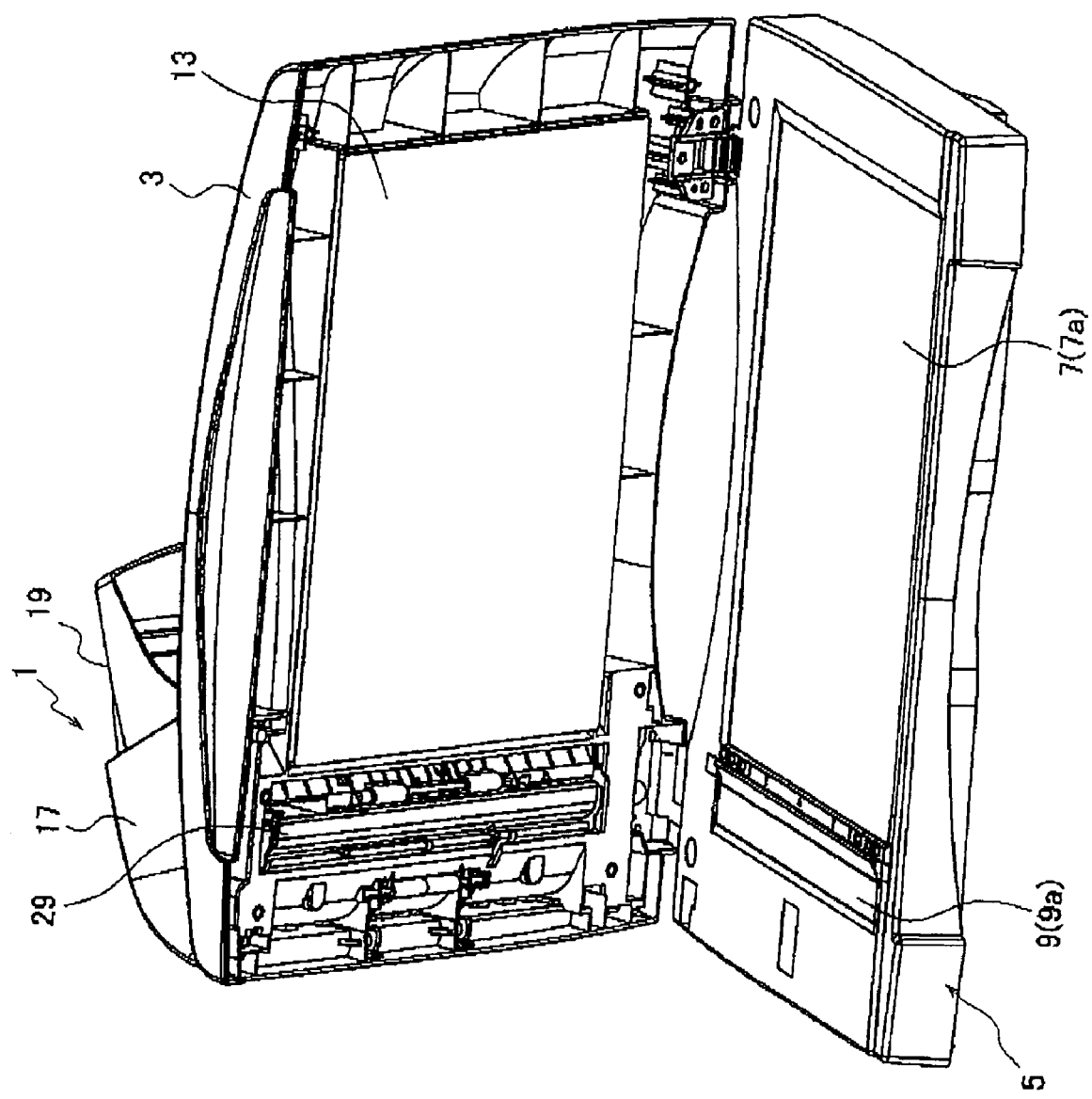
FIG. 2 is a perspective view showing a state in which an original cover 3, of the image reading apparatus 1, is opened.

As shown in FIG. 2, an image reading window 7 (hereinafter, referred to as "stationary reading window 7"), for the stationary original reading function, and an image reading window 9 (hereinafter, referred to as "automatic reading window 9"), for the transport reading function, are provided in a main body unit 5. An original cover 3 is pivotally mounted to the main body unit 5. Stationary reading window 7 is closed by transparent platen 7a, and automatic reading window 9 is closed by transparent platen 9a. The transparent platens 7a, 9a may be made of glass, an acrylic material, or the like.

Figure 4:
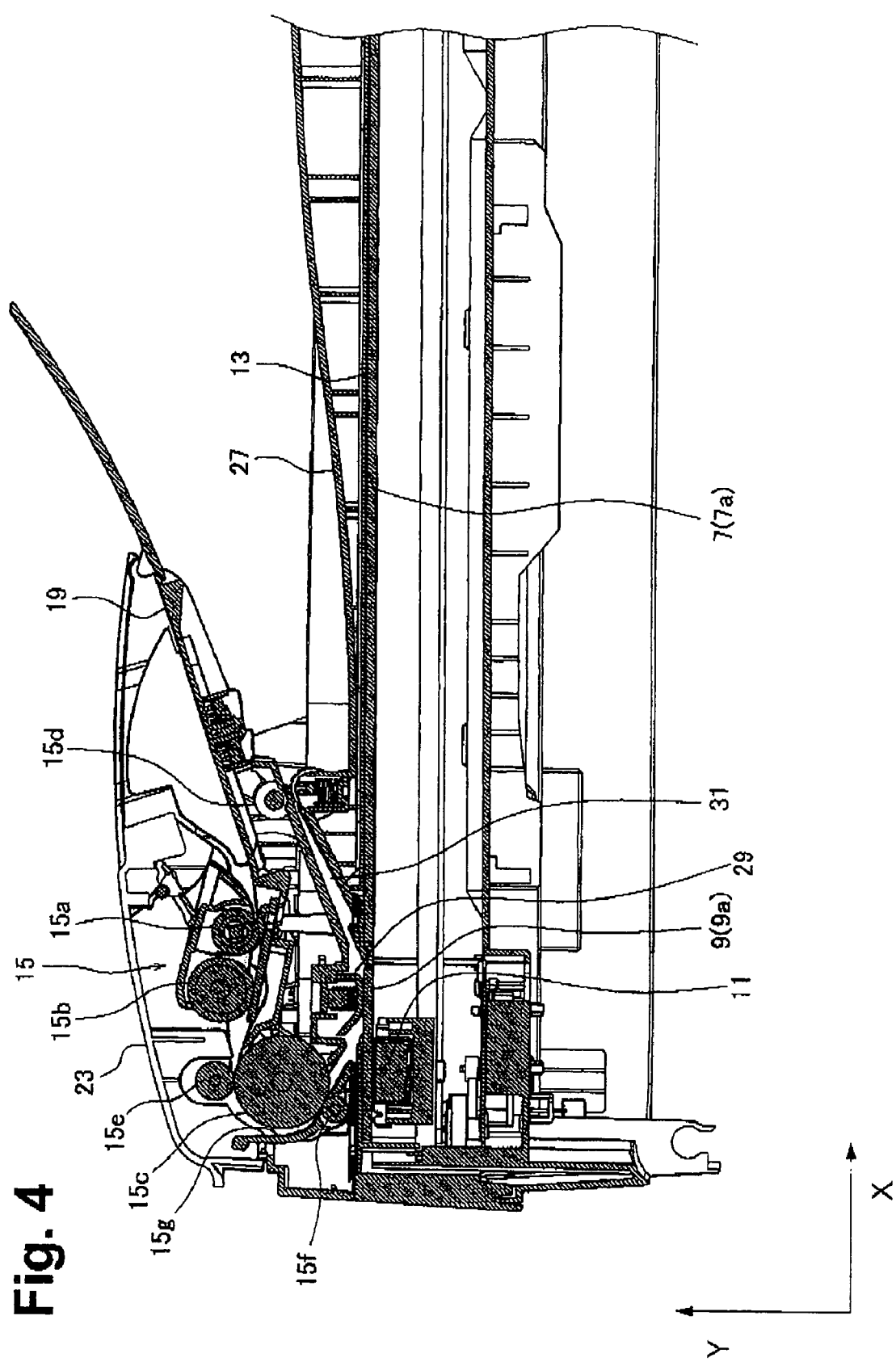
FIG. 4 shows part of a section of the image reading apparatus 1.

In FIG. 4, an image pick-up device 11 receives light applied to, and reflected by, an original and generates an electrical signal based on the received light. The image reading apparatus 1 reads images by converting the images, including characters etc., contained in the original into electrical signals via the image pick-up device 11.

The image pick-up device 11 is incorporated within the main body unit 5, and is movable in the longitudinal direction of the main body unit 5 (in the horizontal direction in FIG. 4). When the transport reading function is activated, the image pick-up device 11 is stops beneath the automatic reading window 9 and reads an image. On the other hand, when the stationary original reading function is activated, the sensor reads images while moving beneath the stationary reading window 7.

In the embodiment, a CIS (Contact Image Sensor) is used as the image pick-up device 11, and the longitudinal direction of the CIS (image pick-up device 11) extends in a direction perpendicular to the XY plane of FIG. 4.

A stationary original holder 13, for holding an original against the stationary reading window 7, is provided in the original cover 3 in a location facing the stationary reading window 7. The stationary original holder 13 pivotally moves integrally with the original cover 3 relative to the stationary reading window 7.

An automatic document feeder device (hereinafter, abbreviated as "ADF device"), having a separation and transport mechanism 15 that transports originals for reading to the automatic reading window 9, is provided in the original cover 3 in a location corresponding to the automatic reading window 9. The details of the ADF device will be described below.

In FIG. 1 or FIG. 2, a base member 17 includes an original placement unit (original tray) 19, in which originals for reading to be transported to the automatic reading window 9 are placed. Various kinds of rollers 15a to 15d (see FIG. 4), which form the separation and transport mechanism 15, are mounted to the base member 17. The base member 17 is fixed to the original cover 3 by fixing means such as screws.

As shown in FIG. 4, the original placement unit 19 is tilted so that an original placed in the original placement unit 19 moves toward the suction roller 15a due to the original's own weight.

The original placement unit 19, as shown in FIG. 1, includes a pair of original guides 21. Each of the original guides 21 are brought into contact with a separate side of the original placed in the original placement unit 19 parallel with the transport direction of the original. The original guides 21 guide the transport of the original. The original guides 21 mechanically work in concert with each other, and are mounted to the original placement unit 19 so as to be displaced in the width direction of the original. Here, "the width direction of the original" refers to a direction perpendicular to both the transport direction of the original and the direction of the thickness of the original placed in the original placement unit 19. The original guides 21 are not limited to being placed on the original placement unit 19. For example, the original guides 21 may be placed on the base member 17.

Further, as shown in FIG. 4, the separation and transport mechanism 15 includes a suction roller 15a, a separation roller 15b, a feed roller 15c, an eject roller 15d, pinch rollers 15e and 15f, and a guide face 15g. The suction roller 15a sucks originals placed in the original placement unit 19. The separation roller 15b separates the suctioned originals one by one and send them to the feed roller 15c. The eject roller 15d ejects the originals to a paper eject tray 27.

Pinch rollers 15e, 15f press the transported original against the feed roller 15c. A guide face 15g guides the original transported from the original placement unit 19 toward the automatic reading window 9. The guide face 15g turns the transportation direction of the original roughly 180°.

In addition, an automatic reading original holder 29 holds the transported original against the automatic reading window 9, and is tilted relative to the automatic reading window 9 so as to be nearly parallel to the tangential direction of the contact point between the feed roller 15c and the pinch roller 15f. Accordingly, the images of the original transported from the original placement unit 19 are read while the original passes through the gap between the automatic reading original holder 29 and the automatic reading window 9. After the images of the original are read, the original is passed through an eject transport path 31 and ejected to the paper eject tray 27.

Figure 3:
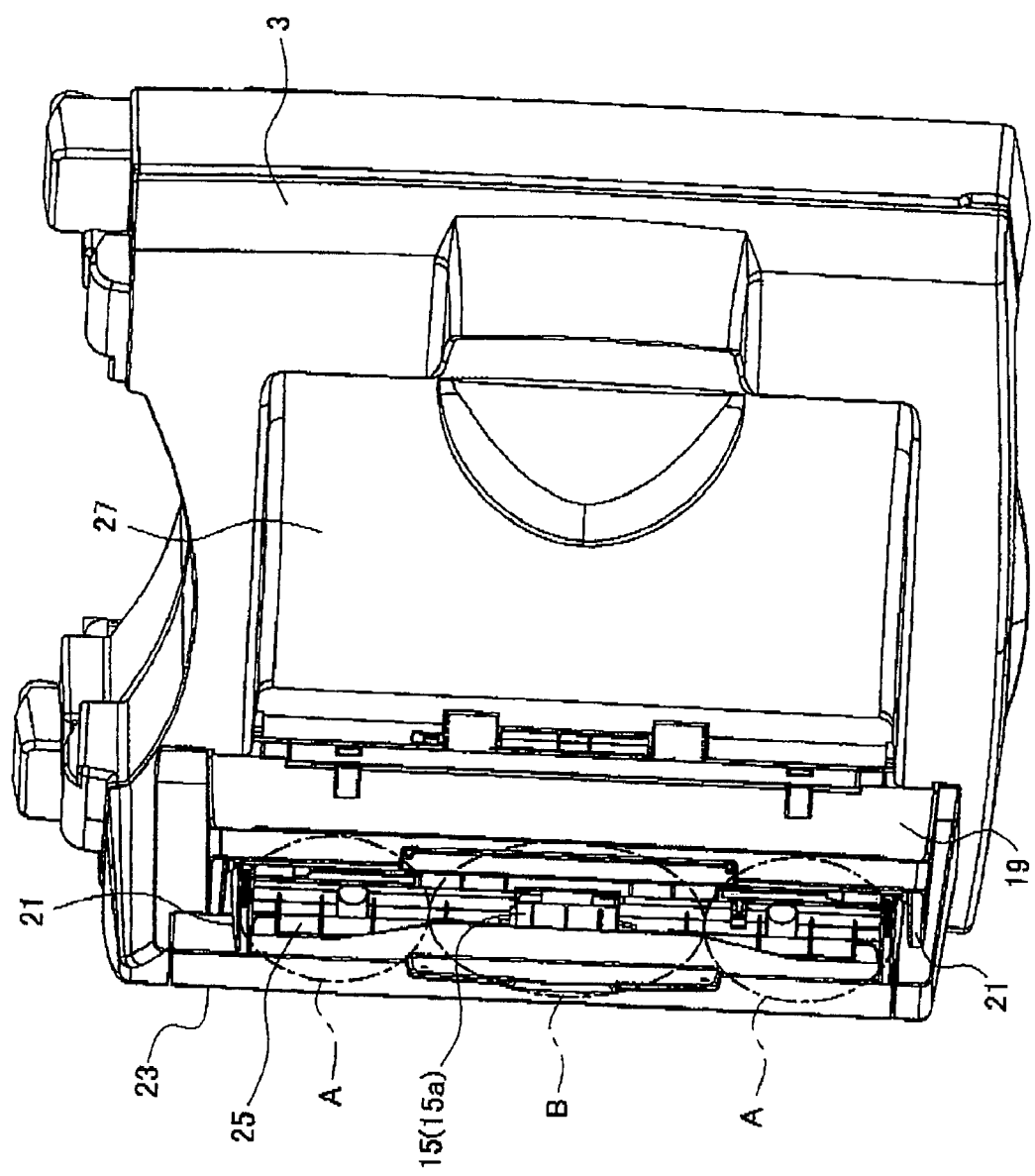
FIG. 3 shows an original insertion opening 25, according to the first embodiment, seen from an insertion direction of the paper to be inserted into the original insertion opening 25.

The topside of the separation and transport mechanism 15 is covered by the cover member 23, and, as shown in FIG. 3, the transport mechanism 15 is positioned corresponding to a nearly central part of the longitudinal direction of the original insertion opening 25, as seen from the insertion direction of the original to be inserted into the original insertion opening 25.

The cover member 23 is pivotally mounted to the base member 17. Accordingly, if the original jams in the separation and transport mechanism 15, it can be removed by opening the cover member 23.

As shown in FIG. 3, the original insertion opening 25 is provided in the cover member 23. The original insertion opening 25 allows originals to be transported from the original placement unit 19 to the separation and transport mechanism 15. The original insertion opening 25 is formed in a nearly rectangular shape with the longitudinal direction perpendicular to both the transport direction of the original and the thickness direction of the original.

The original insertion opening 25 is symmetric with respect to a nearly central part of the original insertion opening 25 in the longitudinal direction. The original insertion opening 25 includes end opening portions A and central opening portion B. The central opening portion B is set in a nearly central part of the original insertion opening 25 in the longitudinal direction, and corresponds to the separation and transport mechanism 15 of the original insertion opening 25. The end opening portions A are set on opposite sides of the central opening B. The size of the end opening portions A are larger than the size of the central opening portion B. In the embodiment shown in FIG. 5, the dimensions of the parts of the end opening portions A parallel to the thickness direction of the original are made larger than the dimension of the part of the central opening portion B parallel to the thickness direction of the original.

In order to smooth the transition between the central opening portion B and the end opening portions A, joint portions of the central opening portion B and the end opening portions A are tilted and enlarged. In addition at least part of each of the end opening portions A exists in a location corresponding to a position between the original guides 21, even when the distance between the original guides 21 is at its smallest.

Figure 6:
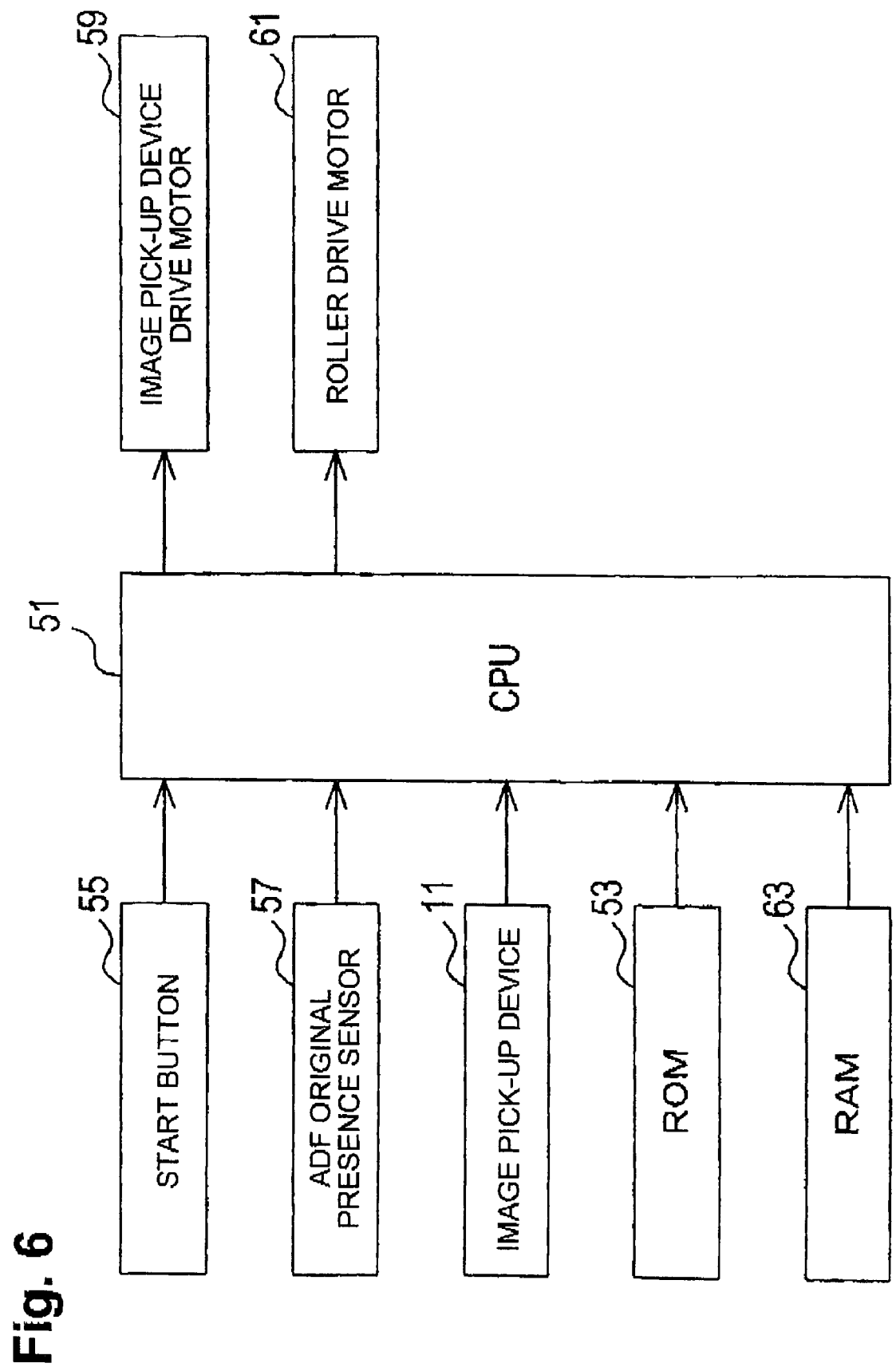
FIG. 6 is a block diagram showing the outline of an electrical configuration of the image reading apparatus 1.

In FIG. 6, a CPU 51 is a processing unit that performs predetermined arithmetic processing according to a program stored in a ROM 53. The ROM 53 is a storage means such as a flash memory or EEPROM capable of retaining the stored program even when the power supply is stopped.

A start switch (start button) 55, for instructing the start of image reading, and an ADF (Automatic Document Feeder) original presence sensor 57, for detecting whether or not an original is placed in the ADF device (original placement unit 19), are connected to the input side of the CPU 51. An image pick-up device drive motor 59, for moving the image pick-up device 11, and a roller drive motor 61, for rotating the various kinds of rollers 15a to 15d that form a part of the separation and transport mechanism 15, are connected to the output side of the CPU 51. An output signal of the image pick-up device 11 is stored in storage means such as a RAM 63.

Figure 7:
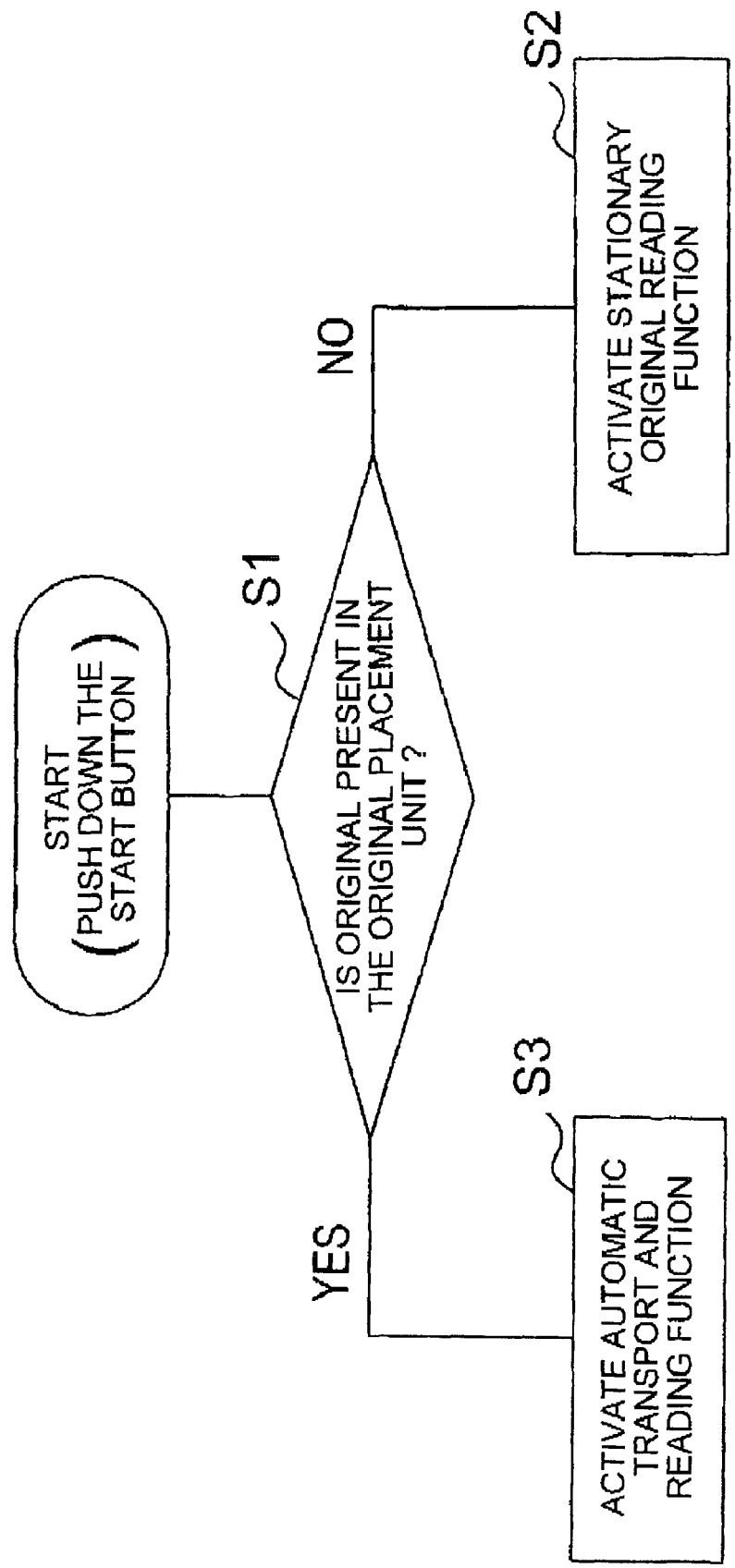
FIG. 7 is a flowchart showing an outline of a control flow from the time when a start button 55 is depressed to the time before a signal is output from the image pick-up device 11.

FIG. 7 is a flowchart showing the outline of a control flow from a time when the start button 55 is depressed to a time before a signal is output from the image pick-up device 11 and the control flow is executed in the CPU 51.

When the start button 55 is depressed, the control flow shown in FIG. 7 is activated. Based on the detection signal of the ADF original presence sensor 57 (S1), either the stationary original reading function (S2) or the transport reading function (S3) is selected.

When the ADF original presence sensor 57 determines that an original is present in the original placement unit 19, the CPU 51 selects the transport reading function. Contrary, when the ADF original presence sensor 57 determines that an original is absent in the original placement unit 19, the CPU selects the stationary original reading function.

If the stationary original reading function is selected, the image pick-up device drive motor 59 is driven and images are read through the stationary reading window 7 (S2). On the other hand, if the transport reading function is selected, the roller drive motor 61 is driven and images are continuously read through the automatic reading window 9 (S3).

Figure 5:
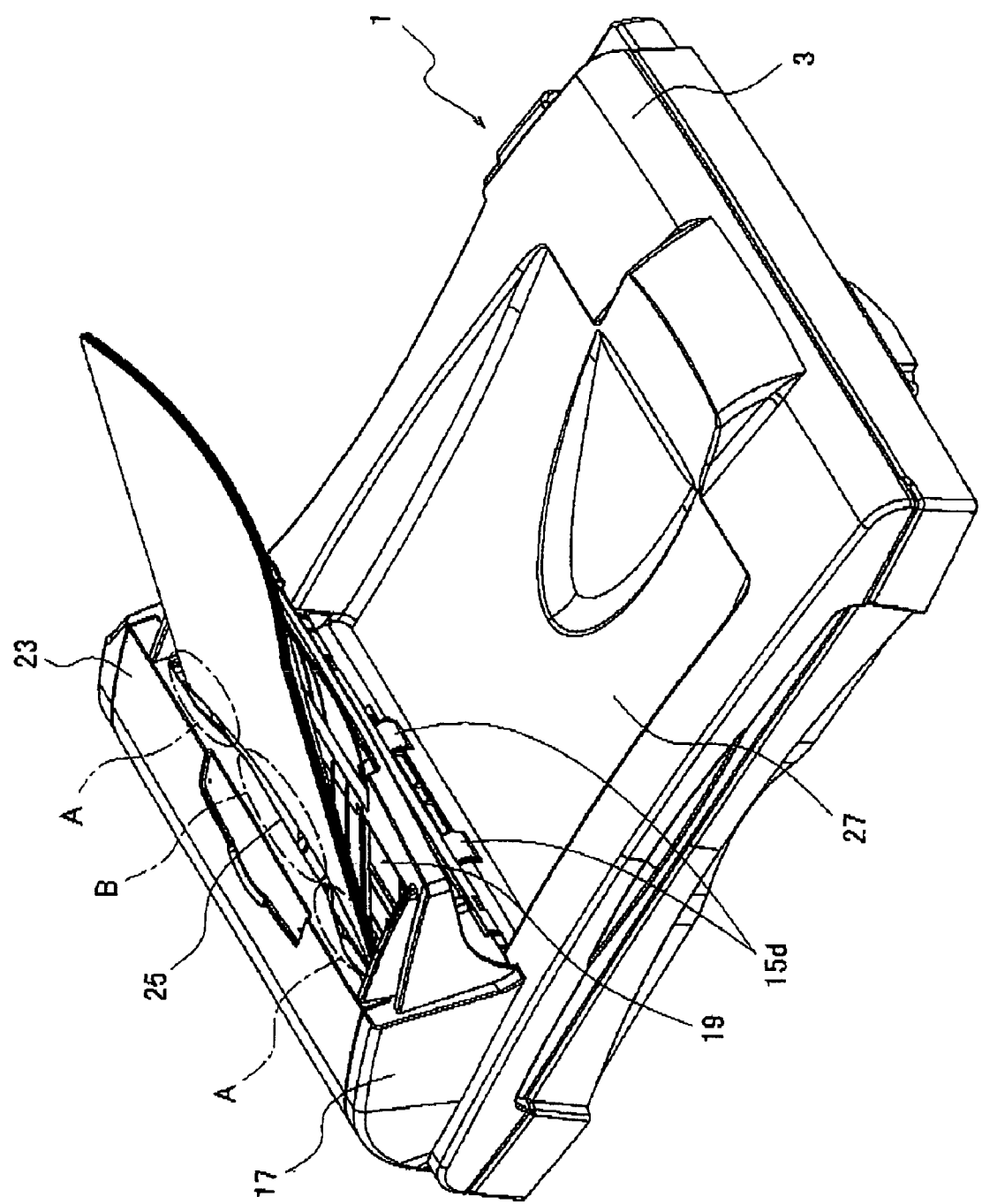
FIG. 5 is a perspective view of the topside of the image reading apparatus 1.
Figure 11:
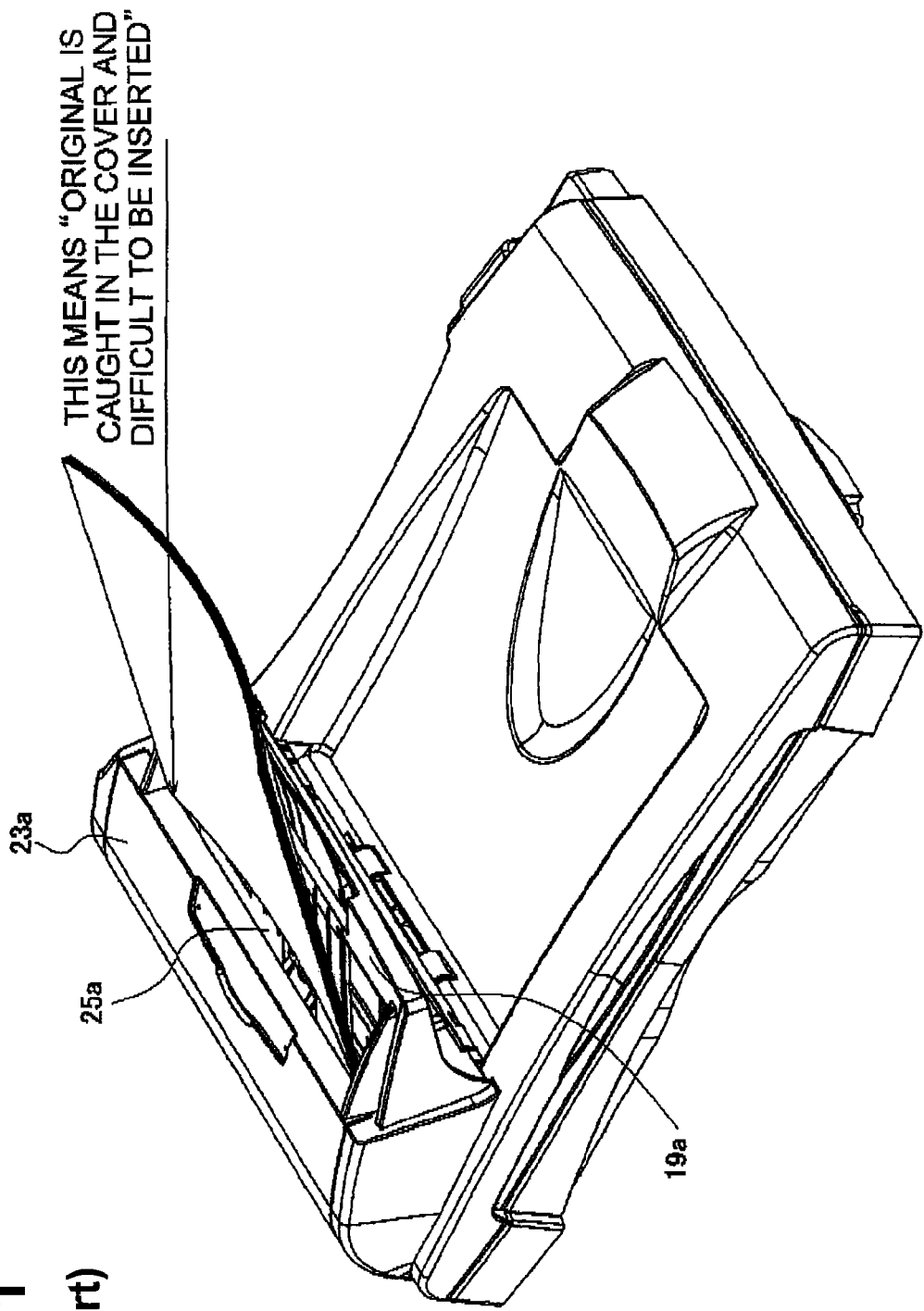
FIG. 11 is a perspective view of the image reading apparatus according to the related art.

When an original is bent in an downwardly convex, arched shape, both ends thereof in the width direction of the original are displaced toward the thickness direction relative to a central part of the original in the width direction as, shown in FIG. 11. However, in the embodiment, the end opening portions A are larger than the central opening portion B, as shown in FIG. 5. Thus, the interference between the original and the original insertion opening 25 can be prevented from occurring even when the original is bent in an arched shape.

Furthermore, since the central opening portion B is smaller than the end opening portions A, the central opening portion B sufficiently covers the separation and transport mechanism 15. Therefore, in the embodiment, the original can be placed in a predetermined place while the separation and transport mechanism 15 is sufficiently covered.

Moreover, when the original is bent in an arched shape, typically the original is continuously curved from the central part to the ends in the width direction. Thus, by smoothly changing the size of the opening portions from the central opening portion B to the end opening portions A, the original can be smoothly placed in a predetermined place.

In addition, even when the distance between the original guides 21 is at its smallest, the end opening portions A are set so that at least part of each of the end opening portions A exists in a location corresponding to a position between the original guides 21. Thus, the original can be precisely placed in a predetermined place even when the distance between the original guides 21 is at its smallest.

Further, when the original is bent in an arched shape, typically the original is symmetrically bent. Thus, by making the original insertion opening 25 symmetric in its longitudinal direction with respect to a nearly central portion, the original can be more precisely placed in a predetermined place.

Figure 8:
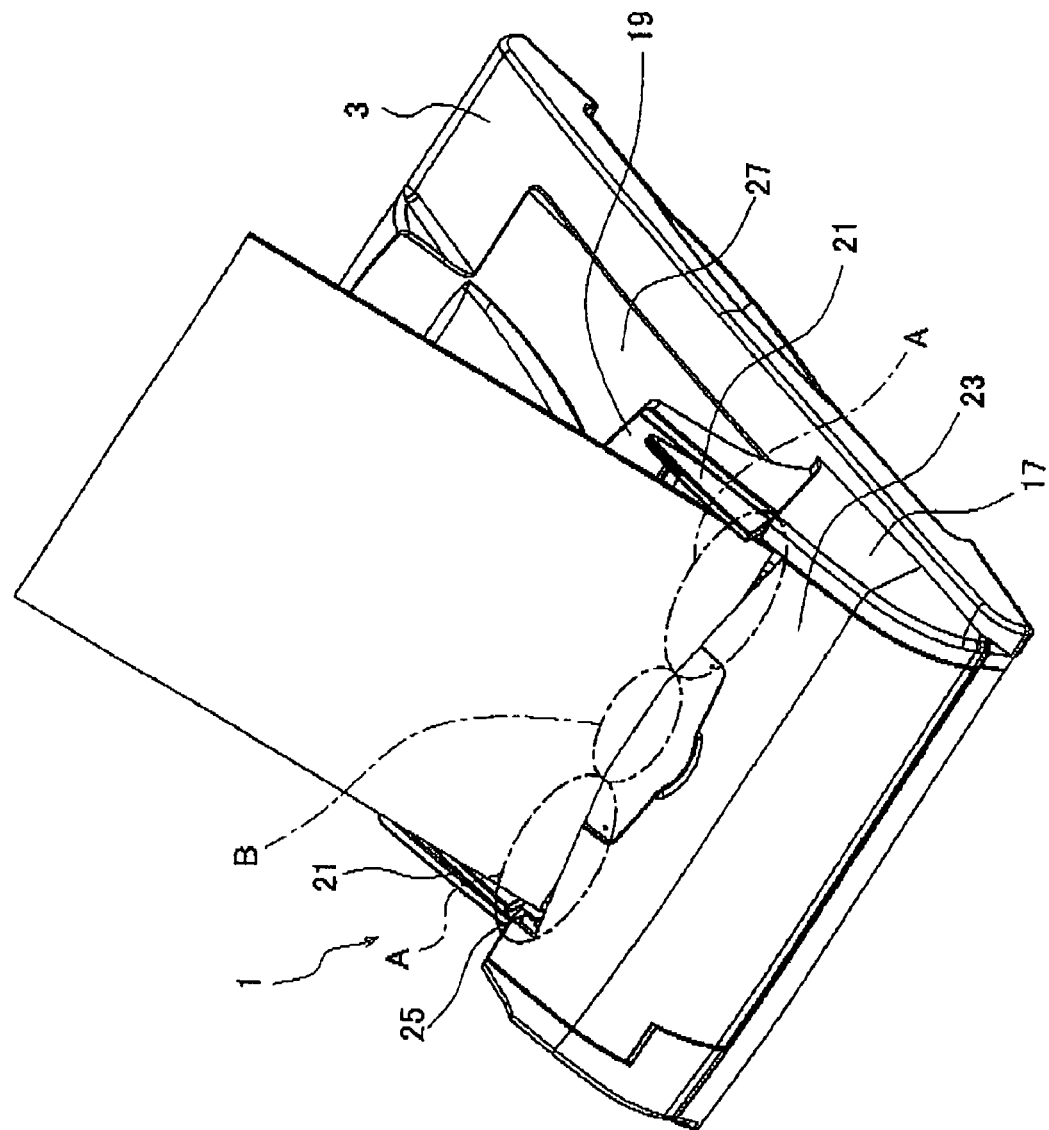
FIG. 8 is a perspective view of the appearance of an image reading apparatus 1 according to a second embodiment of the invention.
Figure 9:
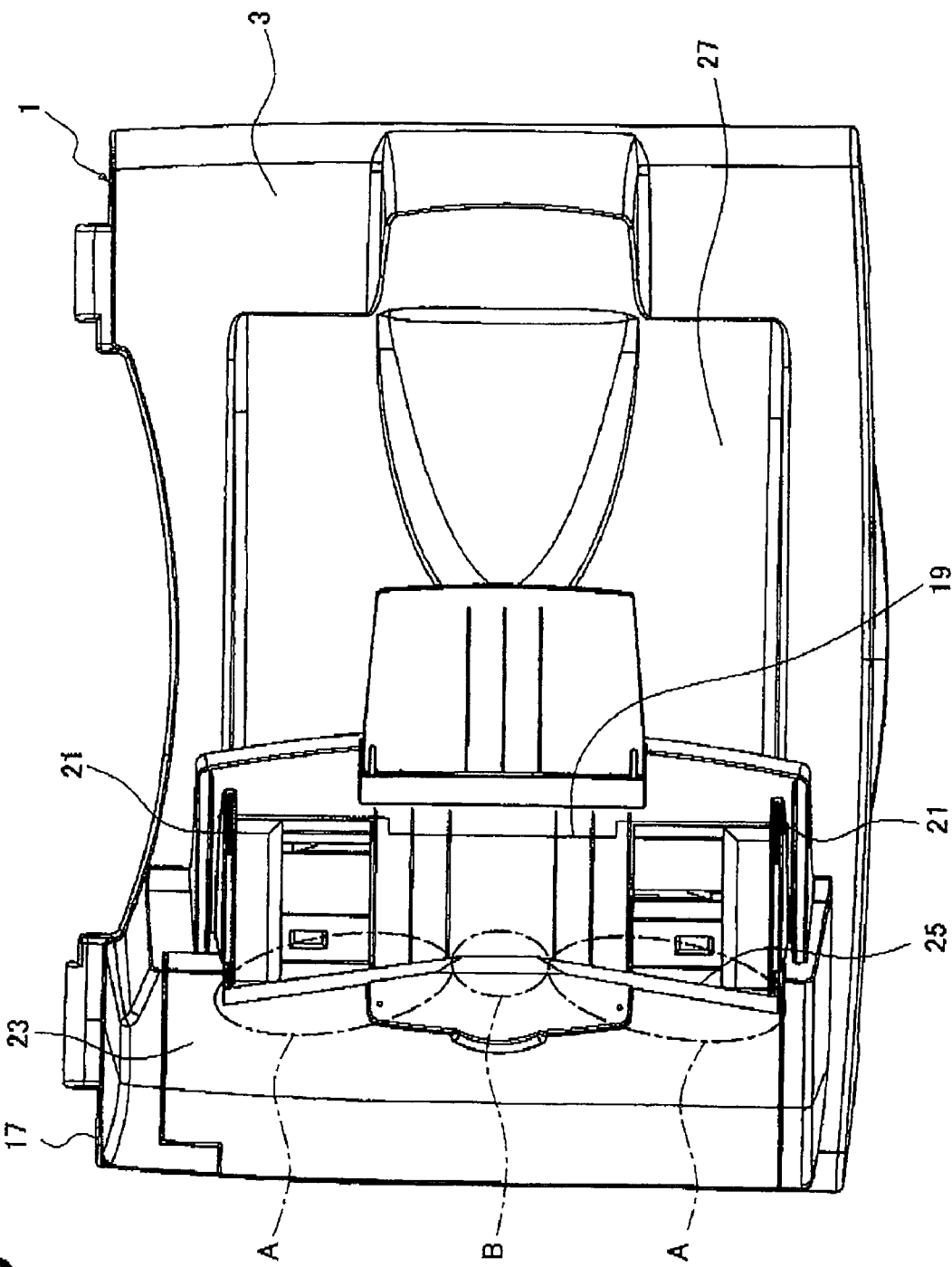
FIG. 9 is a top view of the image reading apparatus according to the first embodiment of the invention.
Figure 10:
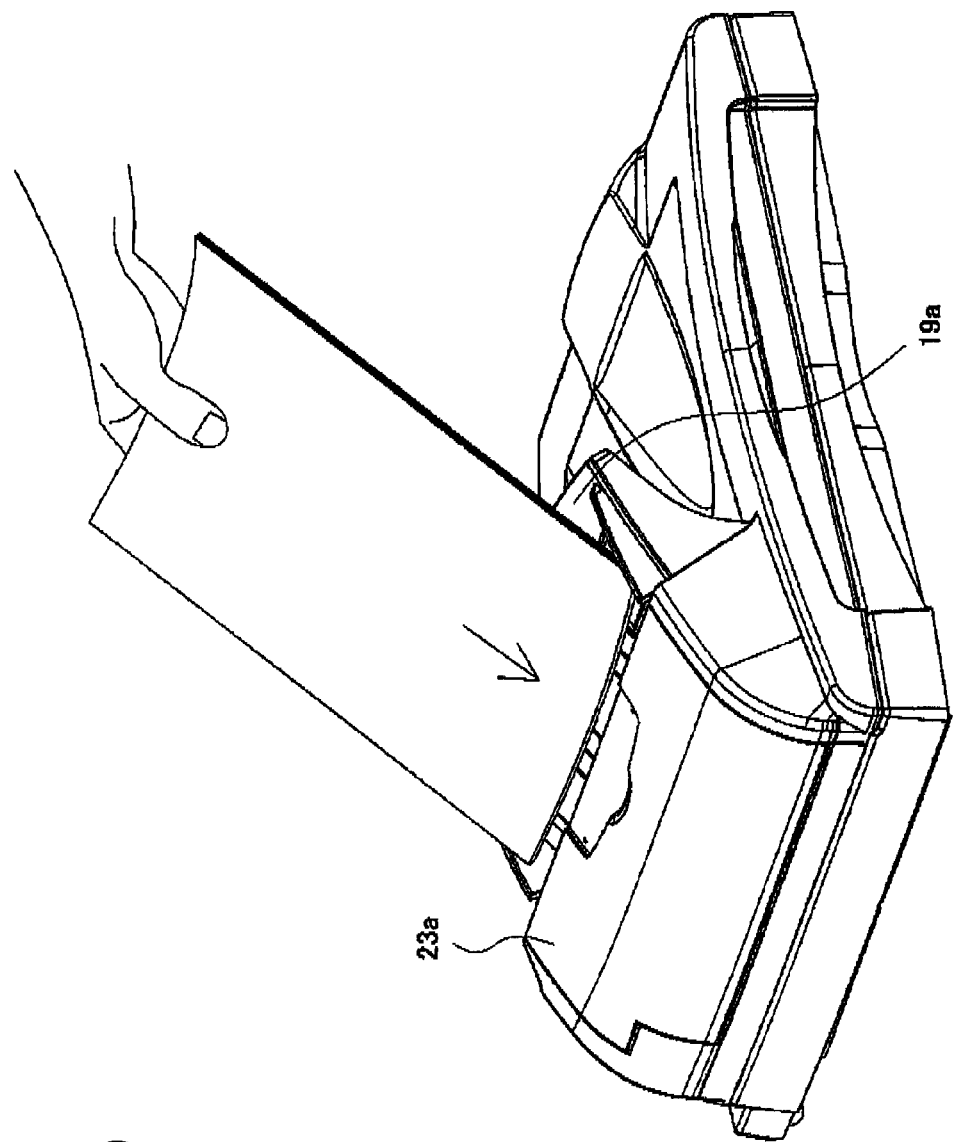
FIG. 10 is a perspective view of an image reading apparatus according to the related art.

In the first embodiment, the end opening portions A are made larger than the central opening portion B by enlarging the end opening portions A in the height direction (in the direction in parallel with the thickness direction of the original). However, this is not the only way to make the end opening portions larger than the central opening portion. In a second embodiment, as shown in FIGS. 8 and 9, the end opening portions A are made larger than the central opening portion B with respect to the direction parallel to the transport direction of the paper. This is affected by curving the top of the original insertion opening such that the top of the central opening portion B extends in a direction opposite, and parallel, to the transport direction of the original, relative to the top of the end opening portions A.

As such, even when an original is bent in an arched shape, as shown in FIG. 8, the interference of both ends of the original, in the width direction, with the original insertion opening 25 (the cover member 23) can be prevented. Accordingly, the original can be placed precisely in a predetermined place while the separation and transport mechanism 15 is sufficiently covered.

In the above described embodiments, the original is bent in an arched shape, where both ends thereof in the width direction of the original are displaced toward the thickness direction relative to a central part of the original in the width direction, and placed in the placement unit 19. The embodiments above describe the ends of the original being displaced toward the thickness direction of the original in roughly equal amounts. However, it may also be the case that one of the ends of the original is displaced in a greater amount than the other end. In such a case, it may be preferable that the paper insertion opening 25 is formed with one large opening portion and one small opening portion. Thus, interference between the original and the paper insertion opening 25 can be prevented from occurring even when the original is bent in such an arched shape and placed in the placement unit 19.

An automatic paper feed device according to an aspect of the invention includes a placement unit, in which paper is placed, and a cover member. The cover member communicates with the placement unit and a separation and transport mechanism. The cover member has a paper insertion opening in a nearly rectangular shape with a longitudinal direction perpendicular to both a transport direction of the paper and a thickness direction of the paper. The paper insertion opening has a center opening portion, which corresponds to the separation and transport mechanism, and two end opening portions, which correspond to the two horizontal ends of the paper insertion opening. Both end opening portions have larger vertical dimensions (the thickness direction of the paper) than the vertical dimension of the center opening portion.

The cover member also covers the separation and transport mechanism. The separation and transport mechanism is provided in a position corresponding to a nearly central part of the paper insertion opening in the longitudinal direction, as seen from an insertion direction of the paper to be inserted into the paper insertion opening.

When the paper is bent in a downwardly convex, arched shape, both ends in the width direction of the paper are displaced relative to the central part in the width direction as shown in FIG. 11. However, since the end opening portions are larger than the central opening portion, the interference between the paper and the paper insertion opening can be prevented from occurring even when the paper is bent in an arched shape. The difference in size between the end opening portions and the central opening portion also allows for the central opening portion to sufficiently cover the separation and transport mechanism. Therefore, the paper can be placed precisely in a predetermined place while the separation and transport mechanism is sufficiently covered.

In addition, both end opening portions of the paper insertion opening have larger horizontal dimensions, in the transport direction of the paper, than that of the center opening portion. Further, the size of the opening portions may change smoothly from the central opening portion to the end opening portions.

In another embodiment, a pair of paper guides, that are movable in the longitudinal direction of the paper insertion opening, are provided in the paper placement unit. The paper guides are brought into contact with the sides of the paper placed in the paper placement unit, thereby guiding the transport of the paper. At least part of each of the end opening portions exists in a location corresponding to a position between the pair of paper guides, even when the distance between the pair of paper guides is at its smallest. Thereby, the paper can be placed precisely in a predetermined place even when the distance between the pair of paper guides is at its smallest.

Further, when the paper is bent in an arched shape, it is generally symmetrically bent. Therefore, in another embodiment, the paper insertion opening is symmetric in the longitudinal direction of the paper insertion opening, with respect to the central part of the paper insertion opening.

According to another embodiment, an image reading apparatus, having an image pick-up device that generates an electrical signal based on received light, is presented. The image reading apparatus includes a reading window, for image reading, and the above described automatic paper feed device, for transporting paper placed in the placement unit to the image reading window. As such, the paper can be precisely placed in a predetermined place in the image reading apparatus.

According to yet another embodiment, an image forming apparatus is presented. The image forming apparatus includes an image forming unit, for forming an image on a medium, and the above described automatic paper feed device, for transporting paper placed in the placement unit to the image forming unit. As such, the paper can be precisely placed in a predetermined place in the image forming apparatus.

The described embodiments are image reading apparatuses. The embodiments have a transport reading function, for reading images contained in originals while the originals are being transported, and a stationary original reading function, for reading images contained originals that are stationary. These embodiments contain automatic paper feed devices.

In the above described embodiments the invention is applied to an image reading apparatus having a transport reading function and a stationary original reading function. However, the invention is not so limited. The invention may also be applied to an image reading apparatus having the transport reading function and not the stationary original reading function. In addition, the invention may be applied to an image reading apparatus integrated with an image forming apparatus, such as an inject printer or a laser printer. In fact, the current invention may be applied to any apparatus in which an image reading apparatus would be useful, such as a facsimile machine, a copy machine, or the like.

Also, in the above described embodiments the invention is applied to an automatic paper feed device that feeds originals to a reading unit of an image reading apparatus. However, the invention is not so limited. The invention may also be applied to an automatic paper feed device that feeds paper to an image forming unit of an image forming apparatus.

In addition, in the above described embodiments the CIS is used as the image pick-up device 11. However, the invention is not so limited. For example, the invention may also use a CCD (Charge-Coupled Device).

Further, the invention should not be construed to be limited to only the two shapes of the original insertion opening 25 as described above.

Moreover, in the above described embodiments the end opening portions A and the central opening portion B are smoothly and continuously formed. However, the invention is not so limited to only that shape.

While this invention has been described in conjunction with the specific embodiments outlined above, it is evident that many alternatives, modifications, and variations will be apparent to those skilled in the art. Accordingly, the preferred embodiments of the invention as set forth above are intended to be illustrative, not limiting. Various changes may be made without departing from the spirit and scope of the inventions as defined in the following claims.

What is claimed is:

1. An automatic paper feed device comprising:
   a placement unit in which paper is placed;
   a separation and transport mechanism that separates paper placed in the placement unit and transports paper placed in the placement unit in a transport direction;
   a cover member; and
   a paper insertion opening in a nearly rectangular shape which is defined by the cover member and the placement unit, the paper insertion opening having a longitudinal direction perpendicular to both the transport direction of the paper and a thickness direction of the paper, the thickness direction of the paper being perpendicular to a plane of the paper which is parallel to the transport direction;
   the paper insertion opening comprising:
      a first end opening portion;
      a second end opening portion; and
      a center opening portion;
      wherein the center opening portion is located in a position corresponding to the separation and transport mechanism;
      wherein the first end opening portion is disposed on one side of the center opening portion in the longitudinal direction of the paper insertion opening, and the second end opening portion is disposed on the other side of the center opening portion in the longitudinal direction of the paper insertion opening; and
      wherein a top of the first end opening portion, a top of the second end opening portion, and a top of the center opening portion are each defined by the cover member;

wherein the cover member covers the separation and transport mechanism;

wherein the paper insertion opening allows paper to be transported from the placement unit to the separation and transport mechanism;

wherein the separation and transport mechanism is provided in a position corresponding to a nearly central location of the longitudinal direction of the paper insertion opening from the perspective of a head on view of the paper insertion opening; and wherein the first and second end opening portions are each larger in size than the center opening portion, such that a thickness dimension, parallel to the thickness direction of the paper, of each of the first and second end opening portions is greater than a thickness dimension of the center opening portion.

2. The automatic paper feed device according to claim 1;

wherein the first end opening portion includes a first end joint portion which connects with a first central joint portion of the center opening portion at a first opening connection point;

wherein a dimension of the paper insertion opening parallel to the thickness direction of the paper increases smoothly and gradually from the first central joint portion to the first end joint portion, such that dimensions parallel to the thickness direction of the paper of the first end joint portion and the first central joint portion at the first opening connection point are equal to each other;

wherein the second end opening portion includes a second end joint portion which connects with a second central joint portion of the center opening portion at a second opening connection point; and wherein the dimension of the paper insertion opening parallel to the thickness direction of the paper increases smoothly and gradually from the second central joint portion to the second end joint portion, such that dimensions parallel to the thickness direction of the paper of the second end joint portion and the second central joint portion at the second opening connection point are equal to each other.

3. The automatic paper feed device according to claim 1;

wherein a size of the center opening portion and a size of the first end opening portion change smoothly from the center opening portion to the first end opening portions; and wherein the size of the center opening portion and a size of the second end opening portion change smoothly from the center opening portion to the second end opening portions.

4. The automatic paper feed device according to claim 1;

wherein a pair of paper guides are provided in the paper placement unit, the pair of paper guides being movable in the longitudinal direction of the paper insertion opening, wherein the pair of paper guides contacts sides of the paper parallel to the transport direction and guides the transport of the paper;

wherein at least a part of the first end opening portion exists in a location corresponding to a position between the pair of paper guides, even when the distance between the pair of paper guides is at its smallest; and wherein at least a part of the second end opening portion exists in a location corresponding to a position between the pair of paper guides, even when the distance between the pair of paper guides is at its smallest.

5. The automatic paper feed device according to claim 1;

wherein the paper insertion opening is symmetric with respect to a nearly central part of the paper insertion opening in the longitudinal direction of the paper insertion opening.

6. The automatic paper feed device according to claim 1;

wherein the automatic paper feed device is provided in an image reading apparatus, having an image pick-up device that (1) generates an electrical signal based on received light and (2) reads an image contained in an original;

the image reading apparatus comprising:

a reading window for image reading.

7. The automatic paper feed device according to claim 1;

wherein the automatic paper feed device is provided in an image forming apparatus;

the image forming apparatus comprising:

an image forming unit that forms an image on paper.

8. An automatic paper feed device comprising:

a placement unit in which paper is placed;

a separation and transport mechanism that separates paper, placed in the placement unit and transports paper placed in the placement unit in a transport direction;

a cover member; and a paper insertion opening which is defined by the cover member and the placement unit;

the paper insertion opening comprising:

a first end opening portion;

a second end opening portion; and a center opening portion;

wherein the paper insertion opening has a longitudinal direction perpendicular to both the transport direction of the paper and a thickness direction of the paper, the thickness direction of the paper being perpendicular to a plane of the paper which is parallel to the transport direction;

wherein the first end opening portion is disposed on one side of the center opening portion in the longitudinal direction of the paper insertion opening, and the second end opening portion is disposed on the other side of the center opening portion in the longitudinal direction of the paper insertion opening; and wherein a top of the first end opening portion, a top of the second end opening portion, and a top of the center opening portion are each defined by the cover member;

wherein the cover member covers the separation and transport mechanism; and wherein the first and second end opening portions are each larger in size than the center opening portion, such that a thickness dimension, parallel to the thickness direction of the paper, of each of the first and second end opening portions is greater than a thickness dimension of the center opening portion.

9. An automatic paper feed device comprising:

a placement unit in which paper is placed;

a transport mechanism; and a paper insertion opening which is defined by a cover member and the placement unit, the paper insertion opening having a longitudinal direction perpendicular to both a transport direction of the paper and a thickness direction of the paper, the thickness direction of the paper being perpendicular to a plane of the paper which is parallel to the transport direction;

the paper insertion opening comprising:
- a first end opening portion;
- a second end opening portion; and
- a center opening portion;
- wherein the first end opening portion is disposed on one side of the center opening portion in the longitudinal direction and the second end opening portion is disposed on the other side of the center opening portion in the longitudinal direction;
- wherein a top of the first end opening portion, a top of the second end opening portion, and a top of the center opening portion are each defined by the cover member;
- wherein the first end opening portion is larger in size than the center opening portion, such that a thickness dimension, parallel to the thickness direction of the paper, of the first end opening portion is greater than a thickness dimension of the center opening portion; and
- wherein the second end opening portion is larger in size than the center opening portion, such that a thickness dimension, parallel to the thickness direction of the paper, of the second end opening portion is greater than the thickness dimension of the center opening portion; and
- wherein the transport mechanism transports paper from the placement unit, through the paper insertion opening, to a predetermined place.

* * * * *